United States Patent
Zilberman et al.

(10) Patent No.: US 11,064,322 B2
(45) Date of Patent: Jul. 13, 2021

(54) METHOD, APPARATUS, AND SYSTEM FOR DETECTING JOINT MOTION

(71) Applicant: HERE Global B.V., Eindhoven (NL)

(72) Inventors: Silviu Zilberman, Rishon Le-Zion (IL); Herman Ravkin, Beer Yakov (IL); Daniel Schmidt, Raanana (IL); Harel Primack, Rishon Le-Zion (IL); Natalia Skorokhod, Givat-Shmuel (IL); Ofri Rom, Ganey Tiqwa (IL)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 16/681,191

(22) Filed: Nov. 12, 2019

(65) Prior Publication Data

US 2021/0144526 A1    May 13, 2021

(51) Int. Cl.
    *H04B 5/00*    (2006.01)
    *H04W 64/00*    (2009.01)
    (Continued)

(52) U.S. Cl.
    CPC .......... *H04W 4/40* (2018.02); *H04B 5/0031* (2013.01); *H04L 67/12* (2013.01); *H04W 4/023* (2013.01);
    (Continued)

(58) Field of Classification Search
    CPC ......... H04W 4/40; H04W 4/80; H04W 4/027; H04W 4/029; H04W 4/023; H04W 64/006; H04L 67/12; H04B 5/0031
    See application file for complete search history.

(56) References Cited

U.S. PATENT DOCUMENTS 8,527,146 B1    9/2013    Jackson et al.
9,661,464 B2*   5/2017    Lerenc ................. H04W 4/023
(Continued)

FOREIGN PATENT DOCUMENTS

WO    2012143301 A1    10/2012
WO    2016205150 A1    12/2016

OTHER PUBLICATIONS

Carreras et al., "Comm2sense: Detecting Proximity Through Smartphones", Article, Mar. 2012, retrieved from https://www.researchgate.net/profile/Venet_Osmani/publication/241630493_Comm2Sense_Detecting_proximity_through_smartphones/links/00463535af8552a16a000000/Comm2Sense-Detecting-proximity-through-smartphones.pdf?origin=publication_detail, 6 pages.
(Continued)

*Primary Examiner* — William Nealon
(74) *Attorney, Agent, or Firm* — Ditthavong, Steiner & Mlotkowski

(57) ABSTRACT

An approach is provided for detecting joint motion using multiple sensor data. The approach, for example, involves retrieving sensor data at least two devices. The sensor data, for instance, is collected using at least one sensor type from among a plurality of sensor types and wherein, and each sensor type of the plurality of sensor types is associated with a respective joint motion classifier. The approach also involves processing the sensor data using the respective joint motion classifier for said each sensor type of the least one sensor type to compute a respective sensor-type joint motion prediction. The approach further involves processing the respective sensor-type joint motion prediction for said each sensor type using a unified classifier to compute a unified joint motion prediction for the at least two devices. The approach further involves providing the unified joint motion prediction as an output.

20 Claims, 13 Drawing Sheets

(51) Int. Cl.
*H04W 4/80* (2018.01)
*H04L 29/08* (2006.01)
*H04W 4/40* (2018.01)
*H04W 4/02* (2018.01)
*H04W 4/029* (2018.01)

(52) U.S. Cl.
CPC .......... *H04W 4/027* (2013.01); *H04W 4/029* (2018.02); *H04W 4/80* (2018.02); *H04W 64/006* (2013.01)

(56) References Cited

U.S. PATENT DOCUMENTS

| | | | |
|---|---|---|---|
| 2010/0159955 A1* | 6/2010 | Aerrabotu | G06F 16/9537 455/456.3 |
| 2011/0004436 A1* | 1/2011 | Beute | H04W 12/003 702/141 |
| 2013/0116908 A1* | 5/2013 | Oh | G05D 1/0278 701/96 |
| 2014/0164322 A1* | 6/2014 | Beaurepaire | G01C 21/3688 707/610 |
| 2015/0149086 A1* | 5/2015 | Alberth, Jr. | H04W 4/40 701/519 |
| 2016/0127900 A1* | 5/2016 | John Archibald | H04W 4/80 726/7 |
| 2016/0270025 A1* | 9/2016 | Osann, Jr. | H04W 4/027 |
| 2017/0178416 A1 | 6/2017 | Barreira Avegliano et al. | |
| 2017/0359698 A1* | 12/2017 | Wirola | H04W 4/029 |
| 2018/0338033 A1* | 11/2018 | Boule | H04M 1/663 |

OTHER PUBLICATIONS

Office Action for related European Patent Application No. 20207288.0-1001, dated Mar. 18, 2021, 7 pages.

* cited by examiner

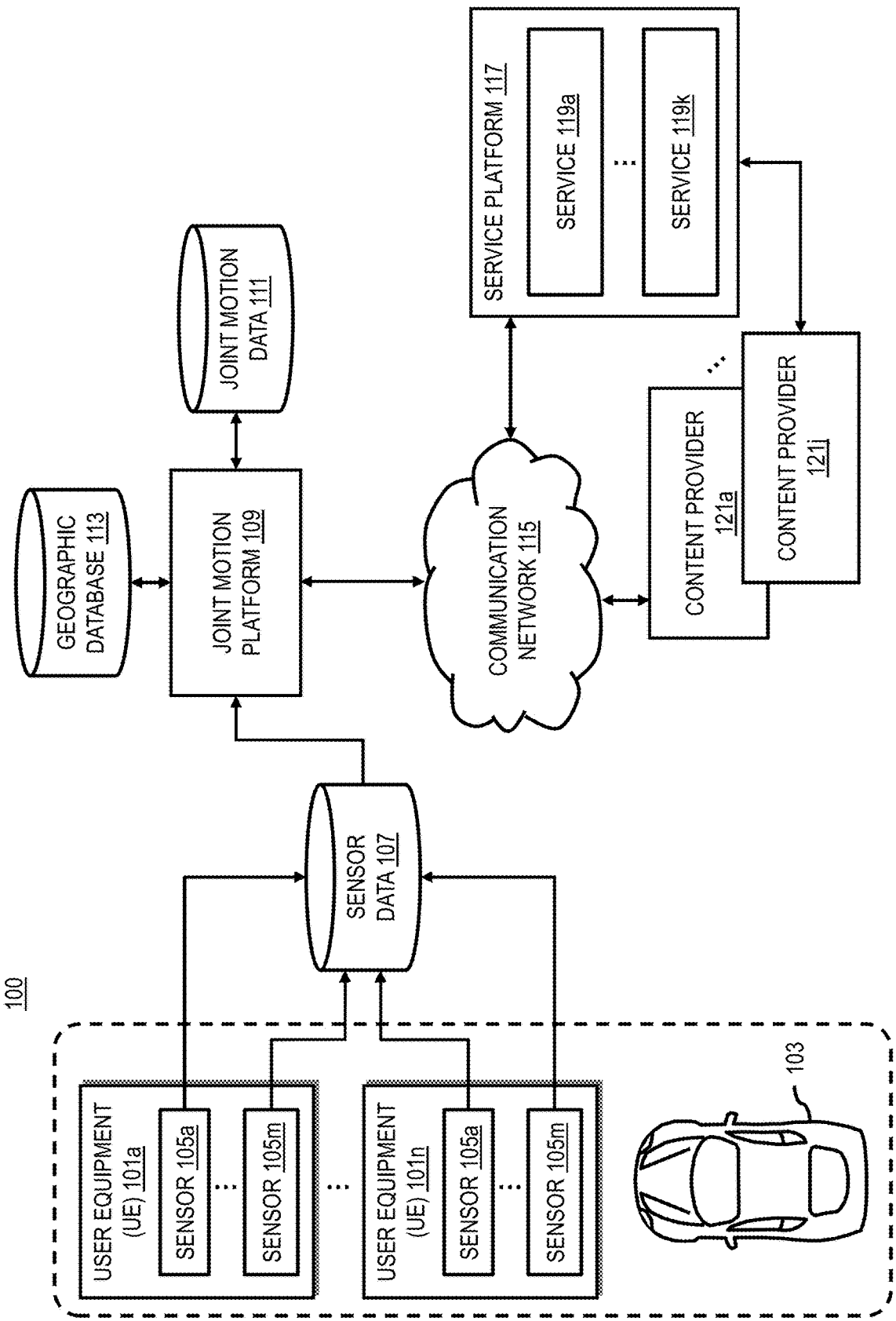

| Motion Situation | Location Based | Accelerometer Correlation Based | BT Based | NFC Based | Acoustic Based | Local Magnetic Field Based |
|---|---|---|---|---|---|---|
| Two people in a car/small airplane / small boat | + | + | + | +/- | + | + |
| Two people in a bus / Train (same car) / large airplane | +/- | + | + | - | +/- | +/- |
| Two people in a train, different cars | +/- | - | - | - | - | - |
| Vehicle stand-still (e.g. in subway) | + | + | +/- | - | + | + |
| No location info (e.g. in subway) | - | - | + | - | + | + |
| No Location and No Acceleration | - | - | + | - | + | + |
| Two cars nearby in a traffic jam | -/+ | + | -/+ | - | +/- | + |

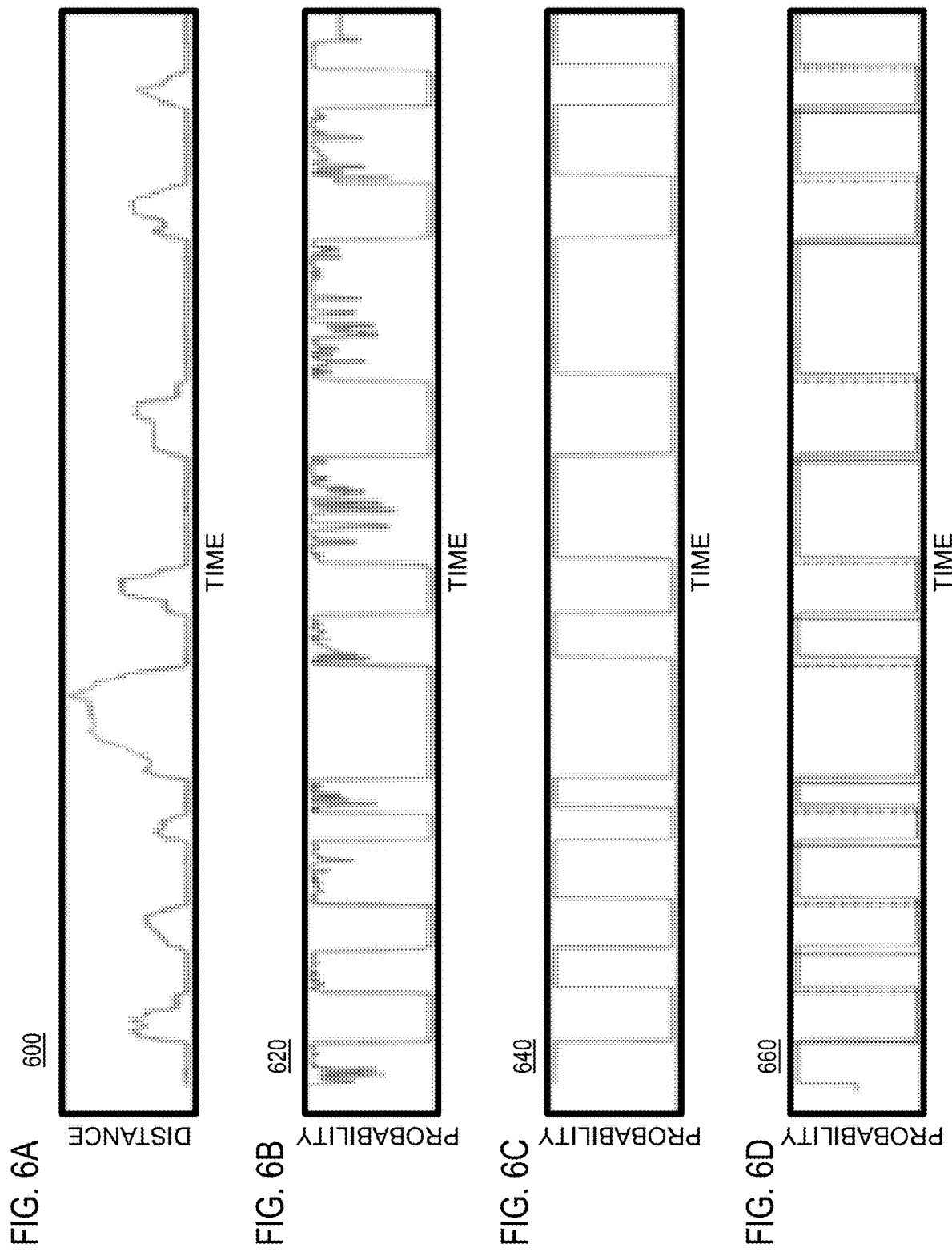

METHOD, APPARATUS, AND SYSTEM FOR DETECTING JOINT MOTION

BACKGROUND

Service providers are continually challenged to provide new and compelling services. One area of development relates to developing services based on detecting whether two or more people are traveling together in the same transportation vehicle (e.g., car, bus, train, etc.). Accordingly, service providers face significant technical challenges to enable automatic and accurate detection of joint motion (e.g., traveling together in the same vehicle) between two or more people or devices to support these services.

SOME EXAMPLE EMBODIMENTS

Therefore, there is a need for an approach for detecting joint motion using sensor data collected from mobile devices.

According to one embodiment, a method for detecting a joint motion based on multiple sensor data comprises retrieving sensor data from a plurality of different sensor types of at least two devices. Each sensor type of the plurality of sensor types, for instance, is associated with a respective joint motion classifier. The method also comprises processing the sensor data using the respective joint motion classifier for said each sensor type to compute a respective sensor-type joint motion prediction. The method further comprises processing the respective sensor-type joint motion prediction for said each sensor using a unified classifier to compute a unified joint motion prediction for the at least two devices. The method further comprises providing the unified joint motion prediction as an output.

According to another embodiment, an apparatus for detecting a joint motion based on multiple sensor data comprises at least one processor, and at least one memory including computer program code for one or more computer programs, the at least one memory and the computer program code configured to, with the at least one processor, cause, at least in part, the apparatus to retrieve sensor data from a plurality of different sensor types of at least two devices. Each sensor type of the plurality of sensor types, for instance, is associated with a respective joint motion classifier. The apparatus is also caused to process the sensor data using the respective joint motion classifier for said each sensor type to compute a respective sensor-type joint motion prediction. The apparatus is further caused to process the respective sensor-type joint motion prediction for said each sensor using a unified classifier to compute a unified joint motion prediction for the at least two devices. The apparatus is further caused to provide the unified joint motion prediction as an output.

According to another embodiment, a computer-readable storage medium for detecting a joint motion based on multiple sensor data carries one or more sequences of one or more instructions which, when executed by one or more processors, cause, at least in part, an apparatus to retrieve sensor data from a plurality of different sensor types of at least two devices. Each sensor type of the plurality of sensor types, for instance, is associated with a respective joint motion classifier. The apparatus is also caused to process the sensor data using the respective joint motion classifier for said each sensor type to compute a respective sensor-type joint motion prediction. The apparatus is further caused to process the respective sensor-type joint motion prediction for said each sensor using a unified classifier to compute a unified joint motion prediction for the at least two devices. The apparatus is further caused to provide the unified joint motion prediction as an output.

According to another embodiment, an apparatus for detecting a joint motion based on multiple sensor data comprises means for retrieving sensor data from a plurality of different sensor types of at least two devices. Each sensor type of the plurality of sensor types, for instance, is associated with a respective joint motion classifier. The apparatus also comprises means for processing the sensor data using the respective joint motion classifier for said each sensor type to compute a respective sensor-type joint motion prediction. The apparatus further comprises means for processing the respective sensor-type joint motion prediction for said each sensor using a unified classifier to compute a unified joint motion prediction for the at least two devices. The apparatus further comprises means for providing the unified joint motion prediction as an output.

According to another embodiment, the method, the apparatus, or the computer-readable storage can be applied by one or more of the at least two devices to detect the joint motion between the at least two devices. In other words, a first device of the at least two devices can perform the embodiments described herein to detect joint motion alone or in combination with a second device of the at least two devices, a cloud component, or a combination thereof.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 1 is a diagram of a system capable of detecting joint motion using multiple sensor data, according to one embodiment;

FIG. 3 is table illustrating examples of computing a unified joint motion prediction from sensor-specific joint motion predictions, according to one embodiment;

FIGS. 6A-6D are graphs illustrating examples of location-based joint motion predictions for use in computing a unified joint motion prediction;

DESCRIPTION OF SOME EMBODIMENTS

Examples of a method, apparatus, and computer program for detecting joint motion using multiple sensor data are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

FIG. 1 is a diagram of a system capable of detecting joint motion using multiple sensor data, according to one embodiment. As discussed above, automatically detecting when two or more people or devices (e.g., user equipment (UE) devices 101a-101n—also referred to as UEs 101—such as phones, tablets, computers, etc. with internet connectivity) are sharing the same transportation vehicle 103 (e.g., car, bus, train, airplane, etc.). This state of sharing or otherwise being in the same transportation vehicle 103 is referred to herein as joint motion (JM) between the two people or UEs 101.

Figure 2B:
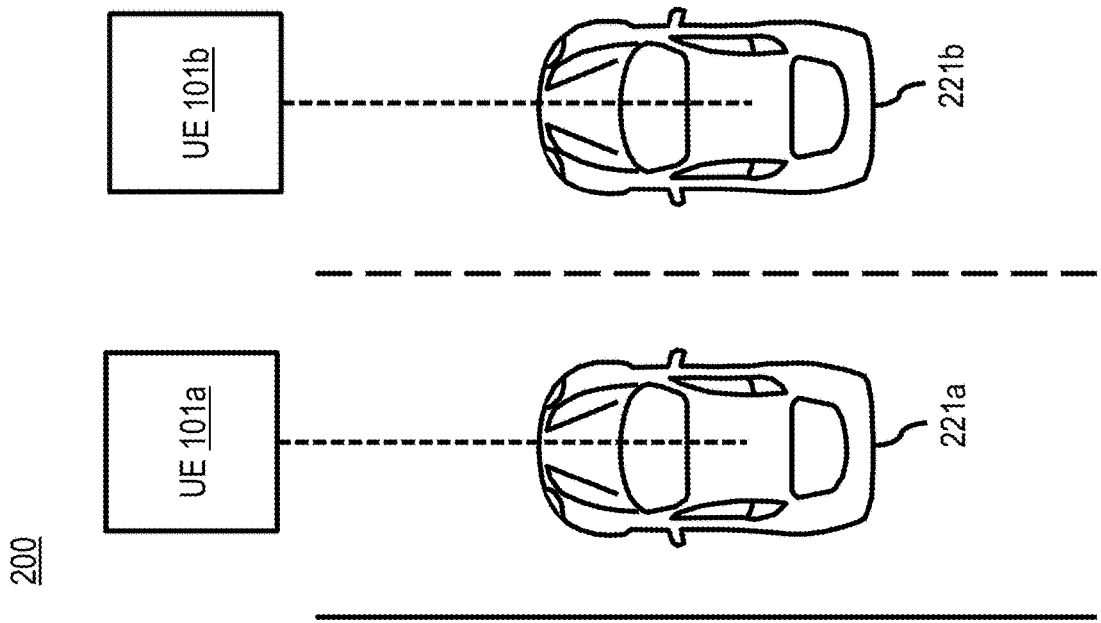
FIGS. 2A and 2B are diagrams illustrating examples of a joint motion and separate motion respectively, according to one embodiment.
Figure 2A:
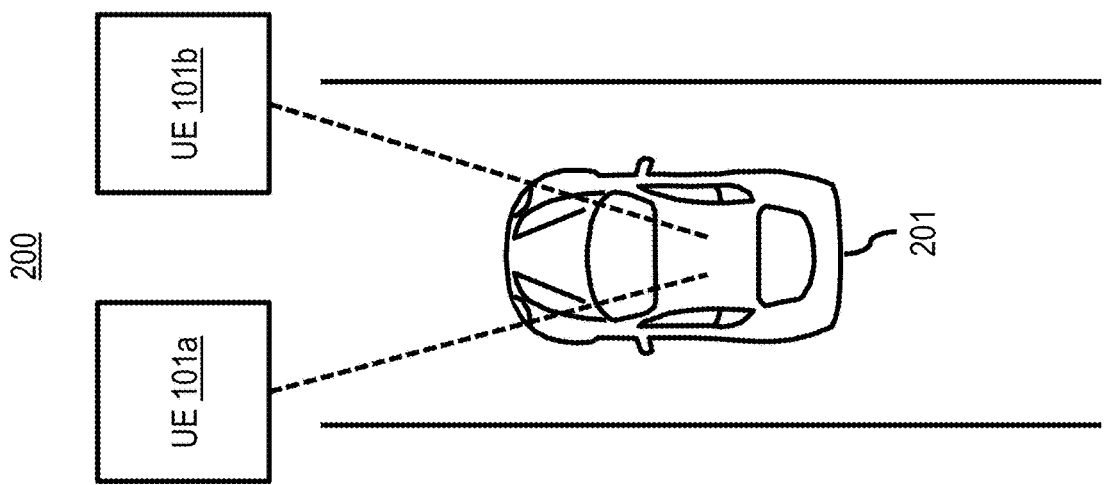

One approach to determining JM or joint path identification is based on location data only (e.g., obtained from location sensors such as but not limited to Global Positioning System (GPS) receivers). However, in many cases location data is not available or inaccurate due to poor reception (e.g. disturbances of the GPS signal from buildings, tunnels, etc.), and JM or proximity is not detected ("false negative"). Moreover, location-based approaches generally cannot account for "false positive" situations. One example of a false positive situation is illustrated in FIGS. 2A and 2B. As shown in example 200 of FIG. 2A, a location data only approach may detect a false positive situation where it determines that two devices (e.g., UEs 101a and UE 101b) are in the same vehicle 201 when instead the true situation is illustrated in example 220 of FIG. 2B where the two UEs 101a and 101b are traveling in different respective vehicles 221a and 221b.

This is because location data only approaches typically compare how closely the location paths of the UEs 101a and 101b are located with respect to each other to determine JM. However, the location data only may not be able to distinguish between the situations of FIG. 2A and FIG. 2B under some circumstances such as where two cars are driving nearby for extended periods of time, as occurring, for instance, in traffic jams or when two cars are following each other closely. In addition, due to the limited accuracy of location information in mobile devices (e.g., typically 10-20 m in good conditions), location data only approaches may falsely detect nearby people or devices as potential JM. As a result, service providers face significant technical challenges to more accurately detecting JM states between people or devices.

To address these technical challenges, the system 100 of FIG. 1 introduces a capability to determine whether two or more people or devices (e.g., UEs 101) are sharing the same transportation vehicle 103 (e.g., car, bus, train, airplane, boat, etc.), based on information extracted from the sensing capabilities external to or separate from traditional positioning sensors (e.g., Global Positioning System (GPS), Global Navigation Satellite System (GNSS), Inertial Measurement Unit (IMU), and/or the like) of mobile devices, such as but not limited to phones and tablets with internet connectivity (e.g., UEs 101 equipped with multiple sensors 105a-105m of different types that sensed different physical characteristics). In one embodiment, the system 100 makes use of several different types of sensors 105, typically found in mobile devices, to collect sensor data 107 and then make individual JM predictions for each sensor type. The individual JM predictions can then be combined by the JM platform 109 to make a unified JM prediction to provide an effective solution in discovering JM behavior. The unified JM predictions or detected JM behaviors can then be output or stored as JM data 111.

The combination of predictions made from different types of sensor data streams provides for several advantages including but not limited to: (1) JM can be determined even in the absence of location data and/or inertial measurement unit (IMU) data; and (2) ability to distinguish between true JM and multiple people or devices moving separately nearby to one another, e.g., like in traffic jams.

In one embodiment, the system 100 uses different JM classifiers optimized for each sensor data type to make individual JM predictions (e.g., individual with respect to each different sensor type). Optimized, for instance, refers to creating or training a classifier (e.g., in the case of machine learning based classifiers) to recognize or take advantage of features or algorithms specific to each type of sensor data being used. A unified classifier (e.g., a state machine, voting algorithm, and/or the like) controls the different sensor-specific JM classifiers and integrates the data (e.g., individual JM predictions) from the available sensor-specific classifiers into a single result. In one embodiment, the JM classifiers used by the system 100 can include JM classifiers based on location data and/or IMU data if, e.g., GPS/GNSS and/or IMU data are available. When such GPS/GNSS and/or IMU are not available (e.g., when operating in areas with interference such as urban canyons, indoor environments, etc.), the system 100 can use JM classifiers that input sensor data from sensors 105 other than GPS/GNSS, IMU, and/or any other type of sensors 105 that provide location or motion as an output value.

The system 100 can integrate any number of sensor-specific JM classifiers including but not limited to any combination of two or more of the components described below:

Location data-based classifier—Using location data derived from GPS/GNSS, cellular towers, WIFI, and/or equivalent location sensors. The underlying assumption here is that close-proximity between two UEs 101 for an extended period (e.g., a period longer threshold duration) is a characteristic of JM. In one embodiment, a variant of the location-based classifier for JM comprises using partial location raw data which do not allow for location determination or for accurate location determination, but still suffice to determine JM accurately.

IMU based classifier—Using data from accelerometers, gyroscopes, magnetometers, and/or equivalent IMU sensors. IMU sensor data of two devices moving together is naturally correlated for the duration of their joint journey.

Barometer based classifier—To be used similarly to IMU data except with data collected from barometric sensors. Close correlation barometric data between two UEs 101 for an extended period (e.g., a period longer than a threshold duration) is a characteristic of JM.

Bluetooth based classifier—Two Bluetooth equipped UEs 101 sensing the received signal strength indication (RSSI) of the other Bluetooth device are very likely to be in nearby ("active BT"). Therefore, close-proximity between two UEs 101 for an extended period (e.g., a period longer than a threshold duration) is a characteristic of JM. In one embodiment, a variant of the Bluetooth based classified is based on two Bluetooth equipped UEs 101 sensing concurrently a third transmitting Bluetooth device ("passive BT").

Near Field Communication (NFC) based classifier—Using data on nearby NFC devices. Given two UEs 101 that can communicate via NFC, the NFC based classifier that the NFC communication connection indicates a proximity of the two UEs 101 of up to 20 cm or other specified NFC range. Close proximity between two UEs 101 for an extended period (e.g., a period longer than a threshold duration) is a characteristic of JM.

Acoustics based classifier—Using active or passive acoustics data to identify two UEs 101 in near proximity. Close proximity between two UEs 101 for an extended period (e.g., a period longer than a threshold duration) is a characteristic of JM.

Maps based meta data classifier—Using map-based data (e.g., as stored in the geographic database 113) can significantly increase prediction quality by providing boundaries on limitations against which JM predictions can be checked. For example, since pickup and drop-off events are unlikely in certain places like highways or tunnels JM motions events are unlikely to start or stop at these locations. Therefore, if JM is detected to start or stop at one of these locations as indicated by the geographic database 113, the classifier can reject the prediction.

FIG. 3 illustrates a table 300 that provides examples of computing a unified joint motion prediction from sensor-specific joint motion predictions, according to one embodiment. In the example of FIG. 3, the system 100 employs six sensor-specific JM classifiers (e.g., location based, accelerometer correlation based, Bluetooth (BT) based, NFC based, Acoustic based, and local magnetic field based) that can be combined to provide a unified JM prediction. Each classifier processes sensor data collected from respective sensor types to make individual predictions of joint motion (e.g., "+" indicating JM, "−" indicating separate motion, and "+/−" indicating insufficient probability or data to make a JM prediction). FIG. 3 illustrates how the various sensor-specific classifiers complement each other under various motion situations (e.g., some JM situations and some separate motion situations). These various complementary results can be used by a unified JM classifier (e.g., state machine, voting algorithm, machine learning classifier, or equivalent) to make unified JM prediction based on the individual JM results, yielding an unprecedented coverage for identifying JM situations.

For example, in a scenario where two different UEs 101 are in different vehicles 103 that are near each other in a traffic jam, using location or GPS/GNSS data alone may result in a falsely classifying the two UEs 101 as being in joint motion (i.e., moving together in the same vehicle 103). This is because there relatively motion may appear to be relatively consistent because the two different vehicles 103 will be moving at approximately the same times and locations relative to each other because they will be stuck within the flow of the traffic jam. However, when other sensor data (e.g., accelerometer data) is considered (alone or in combination with the location data) for detecting joint motion according to the embodiments described herein, a more accurate detection can be obtained. For example, the high frequencies of the accelerometer data obtained from the two UEs 101 will likely differ because the magnetic fields in the two different vehicles 103 are likely to be substantially different.

In one embodiment, the unified JM predictions (e.g., JM data 111) can be transmitted over a communication network 115 as an output to a services platform 117 (e.g., supporting one or more services 119a-119k—also collectively referred to as services 119) and/or content providers 121a-121j (also collectively referred to as content providers 121) to provide one or more potential applications or services including but not limited to any of the following:

In paid rides (e.g. taxi fares), JM prediction can serve as a positive identification that the ride took place and a trigger to payment event, and in some embodiment, can also be used to indicate falsely-cancelled rides to reduce or to prevent fraud;

For personal safety, JM prediction can be sued to verify that passengers took the correct taxi/ride;

For group safety, JM prediction can be used to verify that in a group ride (such as school bus or tourist bus), all individuals are in the bus and no one is left behind;

For ride sharing recommendation, JM prediction can be used to determine the identification of people sharing the same train, and offer them to share a taxi/shared ride for the 'last mile' issue;

For taxi/shared rides, JM prediction can be used to determine the exact location of a pickup and/or drop-off of a passenger;

For insurance, JM prediction enables insurance companies to apply a ride-sharing insurance policy for a shared-ride when the ride occurs and to apply a regular insurance policy when a regular drive (i.e., non-ride-sharing trip) occurs for specific driver with a dual use vehicle.

Figure 4:
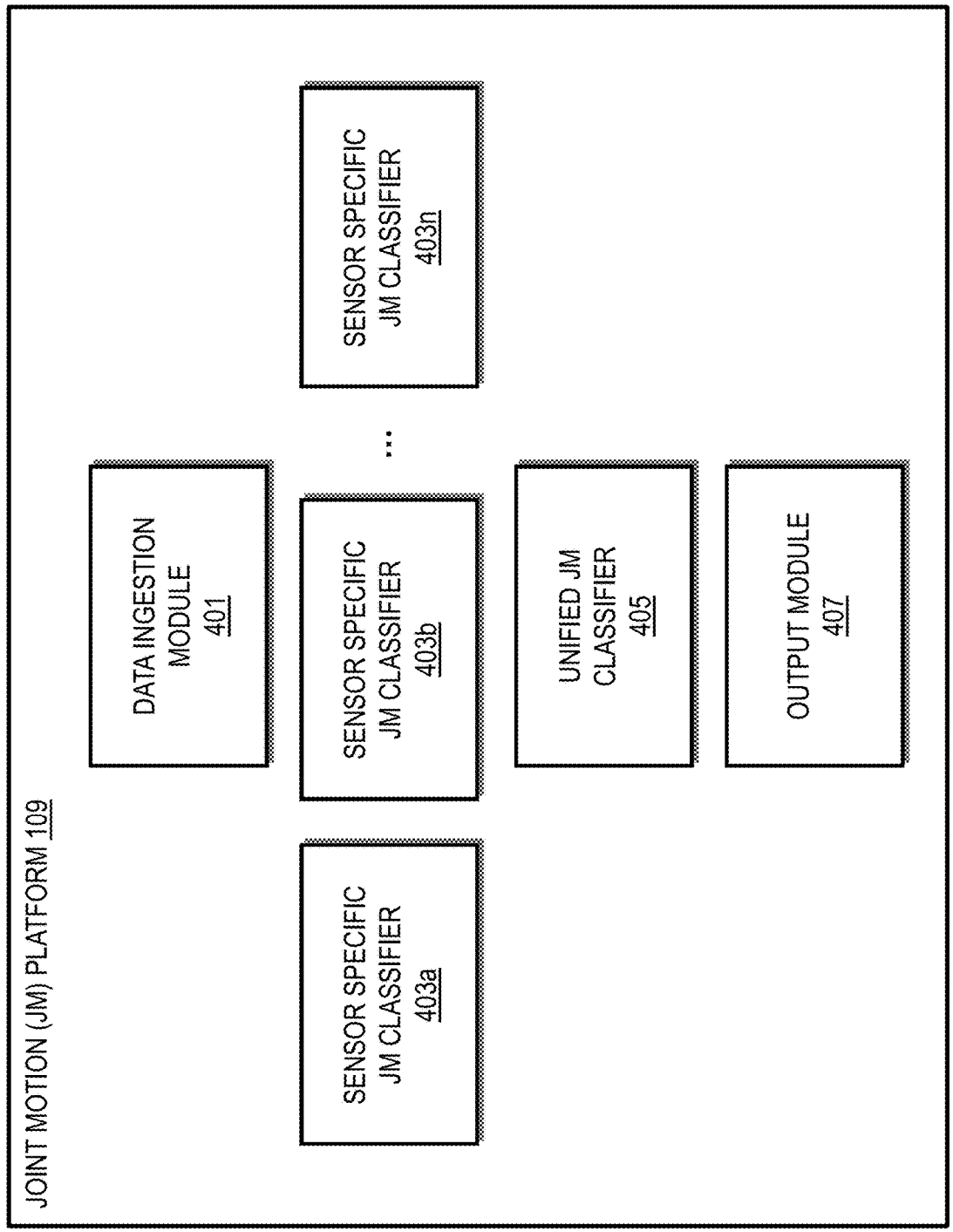
FIG. 4 is a diagram of components of a joint motion platform, according to one embodiment.

In one embodiment, the system 100 includes a JM platform 109 that is capable of performing one or more functions related to detecting JM based on multiple sensor data, according to one embodiment. As shown in FIG. 4, the JM platform 109 includes one or more components to perform the functions. In addition or alternatively, in one embodiment, one or more of the UEs 101 for which joint motion is being detected may include one or more equivalent components to perform the JM detection functions alone or in combination with the JM platform 109. It is contemplated that the functions of these components may be combined or performed by other components of equivalent functionality. In this embodiment, the JM platform 109 includes a data ingestion module 401, two or more sensor specific JM classifiers 403a-403n (also collectively referred to as JM classifiers 403), unified JM classifier 405, and output module 407. In one embodiment, the sensor specific JM classifiers 403 and/or the unified classifier 405 can be based on one or more machine learning models, other JM classification algorithms, and/or equivalent (e.g., decision trees, rules, etc.) to predict JM from corresponding sensor data 107 from associated with respective sensor types (e.g., location sensors, IMU sensors, BT sensors, NFC sensors, acoustic sensors, magnetometers, etc.) and/or map meta data (e.g., queried from the geographic database 113), according to the embodiments described herein. In one embodiment, the unified classifier 405 can be a state machine, voting algorithm, and/or equivalent that input the individual JM predictions of the sensor specific JM classifiers 403 to compute a unified JM prediction, according to the embodiments described herein. The above presented modules and components of the JM platform 109 can be implemented in hardware, firmware, software, or a combination thereof. Though depicted as a separate entity in FIG. 1, it is contemplated that the JM platform 109 may be implemented as a module of any other component of the system 100 (e.g., a component of a services platform 117, any of the services 119, UE 101, vehicle 103, etc. In another embodiment, one or more of the modules 401-407 may be implemented as a cloud-based service, local service, native application, or combination thereof. The functions of the JM platform 109 and the modules 401-407 are discussed with respect to FIGS. 5-8 below.

Figure 5:
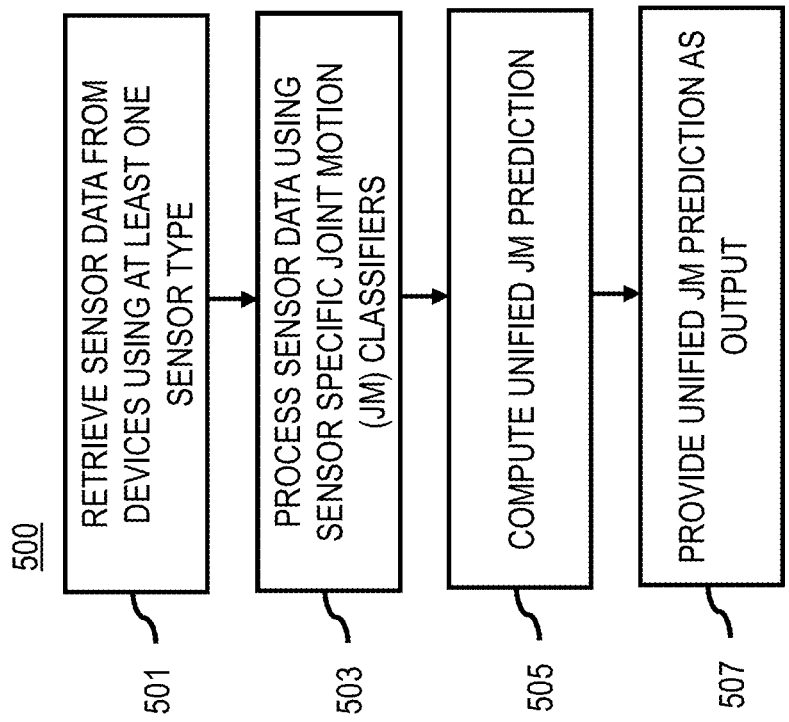
FIG. 5 is a flowchart of a process for detecting joint motion using multiple sensor data, according to one embodiment.
Figure 11:
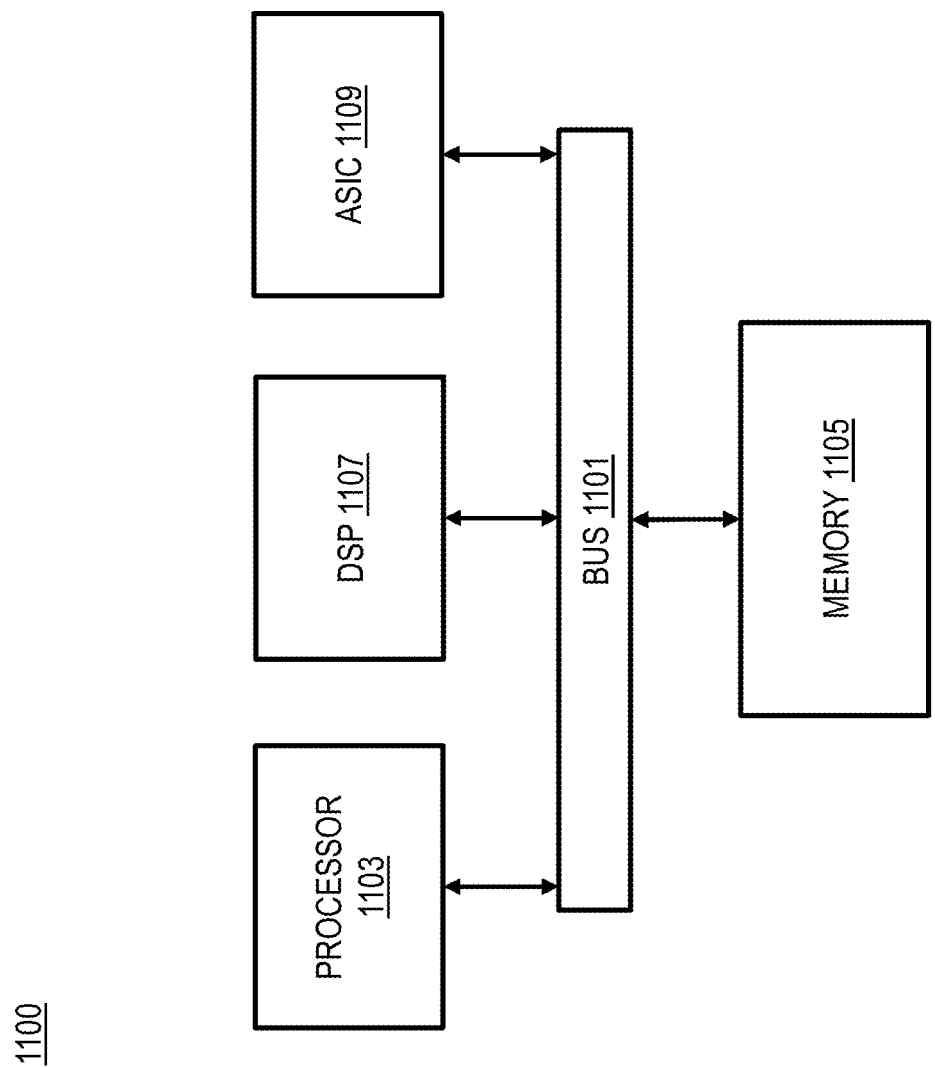
FIG. 11 is a diagram of a chip set that can be used to implement an embodiment.

FIG. 5 is a flowchart of a process for detecting joint motion using multiple sensor data, according to one embodiment. In various embodiments, the JM platform 109 and/or any of the modules 401-407 of the JM platform 109 may perform one or more portions of the process 500 and may be implemented in, for instance, a chip set including a processor and a memory as shown in FIG. 11. As such, the JM platform 109 and/or the modules 401-407 can provide means for accomplishing various parts of the process 500, as well as means for accomplishing embodiments of other processes described herein in conjunction with other components of the system 100. Although the process 500 is illustrated and described as a sequence of steps, its contemplated that various embodiments of the process 500 may be performed in any order or combination and need not include all of the illustrated steps.

In step 501, the data ingestion module 401 retrieves sensor data at least two devices (e.g., UEs 101). The sensor data, for instance, is collected from the UEs 101 using at least one sensor type from among a plurality of sensor types available at the UEs 101. When determining joint motion between two or more people, each UE 101 corresponds to each person (e.g., each UE 101 is a personal device of the person). The UE 101, for instance, can be a mobile device equipped with an array of sensors of various types (e.g., location sensors, IMU sensors, BT sensors, NFC sensors, acoustic sensors, etc.). In other words, a sensor type refers to a sensor configured to measure or detect a different physical characteristic or parameter. In one embodiment, the joint motion platform 109 is configured with a different JM classifier, algorithm, etc. for generating a JM motion prediction from sensor data of a particular sensor type such that each sensor type of the plurality of sensor types (e.g., to be processed by the JM platform 109) is associated with a respective JM classifier 403.

In step 503, the respective JM classifier 403 processes the sensor data using the respective joint motion classifier for said each sensor type to compute a respective sensor-type joint motion prediction. In other words, the sensor data stream from each type of sensor of each of the UEs 101 is processed separately to make a joint motion prediction based only on the corresponding sensor data from a given sensor type to compute each sensor type joint motion prediction. These sensor-type joint motion predictions can also be referred to as individual joint motion predictions (i.e., individual to each sensor type). In one embodiment, the JM platform 109 can select a set of sensor types that are to be used to make a unified joint motion prediction on a system-wide basis or a case-by-case basis (e.g., depending on the capabilities or configuration of UEs 101 associated the people being evaluated for joint motion, on the availability of sensor data, availability of a JM classifier, etc.). Embodiments of the example sensor-specific or sensor type JM classifiers 403 are described below.

Location-Based JM Classifier 403a:

In one embodiment, the plurality of different sensor types configured in the UEs 101 includes a location sensor type that collects location data (e.g., via location sensors such as GPS/GNSS, cellular based location, WiFi based location, etc.). By way of example, the Location-Based JM classifier 403a operates as follows according to one embodiment:

(1) The Location-Based JM classifier 403a assumes that the uncertainty of the position estimation at each sample position is known. If unknown, certain simplifying assumptions can be made, such as assuming that all samples are derived from the same distribution. This distribution is either known empirically or modelled by a known distribution such as (but not limited to) a normal distribution. Without loss of generality, the embodiment described herein illustrates but is not limited to the case where all samples are derived from the same normal distribution.

(2) In a hypothesis-testing situation, the null hypothesis corresponds to the two (or more devices) belonging to random samples of a common normal distribution.

$$f(x \mid \mu, \sigma^2) = \frac{1}{\sqrt{2\pi\sigma^2}} \exp\left[-\frac{(\vec{x}-\vec{\mu})^2}{2\sigma^2}\right]$$

(3) The resulting distances are positive-definite and belong to a special case of the Chi Distribution, known as the Rayleigh Distribution in 2D or Chi with three degrees of freedom for the 3D case. Each instantaneous probability at each time instance $t_k$ for JM depends on the distance $d_k$.

$$P(d_k) = 1 - CDF[Ry(d_k)]$$
$$Ry = \frac{(\vec{x}-\vec{\mu})}{\sigma^2} \exp\left(-\frac{(\vec{x}-\vec{\mu})^2}{2\sigma^2}\right)$$

(4) By multiplying the k snapshots probabilities across a time window, the Location-Based JM classifier 403a gets a window score from the rolling probability:

$$P_{window} = \frac{\prod_k P_k}{\prod_k P_k + \prod_k (1-P_k)}$$

FIGS. 6A-6D illustrates an example use case of using the Location-Based JM classifier 403a for location-based JM prediction. The example use case illustrates a few points. Firstly, FIG. 6A illustrates a subplot 600 that depicts the distance that two UEs 101 are apart over a period of time (e.g., the y-axis indicates increasing distance from bottom to top, and the x-axis indicates increasing time from left to right). Location sensor data is used to determine the distance that the two UEs 101 are apart from each other. According to the FIG. 6A, the two UEs 101 met and separated eight times, with each "hill" in the subplot 600 corresponding to a period of separated motion.

The subplot 620 of FIG. 6B, subplot 640 of FIG. 6C, and subplot 660 of FIG. 6D highlight various aspects of the location-based JM prediction, according to one embodiment. For example, subplot 620 of FIG. 6B shows the instantaneous Rayleigh probability of whether the UEs 101 are in joint motion or separate. In this example, the probability of joint motion is on the y-axis and increases from bottom to top, and time is on the x-axis and increase from left to right. Subplot 620 shows some probability fluctuations resulting from instantaneous distance calculations and the noisy signal. Subplot 640 of FIG. 6C highlights the effect of the windowing method described above in smoothing the plot and providing a solution for the window. The example of subplot 640 is based on σ=20 m and T=60 s. The final subplot 660 of FIG. 6D indicates labelled events superimposed on the decision plot with a decision based on: P<0.1 indicating separate motion, P>0.9 indicating joint motion, and 0.1≤P≤0.9 indicating undecided motion. Darker lines correspond to separations and dashed lines to gatherings of the two UEs 101. In this example, the Location-Based JM classifier 403a discovered all important JM/separate motion events within the first window of their occurrence.

In one embodiment, the Location-Based JM classifier 403a can operate using partial location data. Partial location data, for instance, is location data that is computed using less than a number of independent data items for computing non-partial location data. For example, the location data in mobile device operating systems (e.g., Android OS) is determined, in general, by assimilation of data taken from various location data sources including but not limited to location satellites (e.g., GPS/GNSS satellites), cellular network (e.g., location of cellular towers/base stations/antennas and estimated distance), and WiFi network (e.g., location of stations and estimated distance). For these location methods, there generally is a minimum of concurrent and independent data items that is needed to estimate location. For example, data from at least four location satellites is required to determine latitude, longitude and elevation. However, to establish JM, fewer data items can be used, e.g., location satellites less than the minimum of four in case of obstruction due to urban environment. In this case, good correlation between the data transmitted by a single satellite, as received in two or more UEs 101 (e.g., smartphones) can be indicative to JM. Therefore, in one embodiment, the Location-Based JM classifier 403a can use partial location data to make JM predictions.

IMU-Based JM Classifier 403b:

In one embodiment, the plurality of different sensor types configured in the UEs 101 includes IMU sensors. Since location provides only part of the picture, the embodiments described herein can utilizes IMU sensors in addition or as alternate to location sensors or other sensor types. Conceptually, the embodiments of the IMU-Based JM classifier 403b are also applicable to any time-series based sensor that can be used in discovering cross-correlations between devices (e.g., barometric sensors, etc.). In one embodiment, a cross-correlation function can be used as a measure of similarity between two time series, acting as a function of the displacement of one function relative to the other. The function is also known as the sliding dot (inner) product.

By way of example, for discrete functions, the cross-correlation can be defined as (or equivalent):

$$(f*g)[n] \stackrel{def}{=} \sum_{m=-\infty}^{\infty} f^*[m]g[m+n]$$

where f, g are two discrete functions, f* is the complex conjugate of f, and n refers to the lag between the two functions.

Two highly correlated time series (like those that would be expected to be seen in a JM situation) would result in a high global maximum correlation value, located very close to zero offset, at a small lag dt. The lag corresponds to the time difference between the two devices (differences in their time synchronization).

A separate motion scenario would yield a low value of maximum correlation score, with a highly varying lag factor. In one embodiment, for two uncorrelated time series, the maximum correlation is as small as the noise level and its position is random within the time window.

The IMU signals are typically noisy, due to their limited accuracy, but also due to undesired effects such as users utilizing their phones and causing movements unrelated to joint motion. Thus, in one embodiment, the raw IMU signals can be preprocessed to time-align the measurements from the two (or more) UEs 101, filter out high frequency noise and account for motion artifacts (due to user utilization), e.g., by incorporating gyroscope data with the accelerometer or equivalent.

Figure 7A:
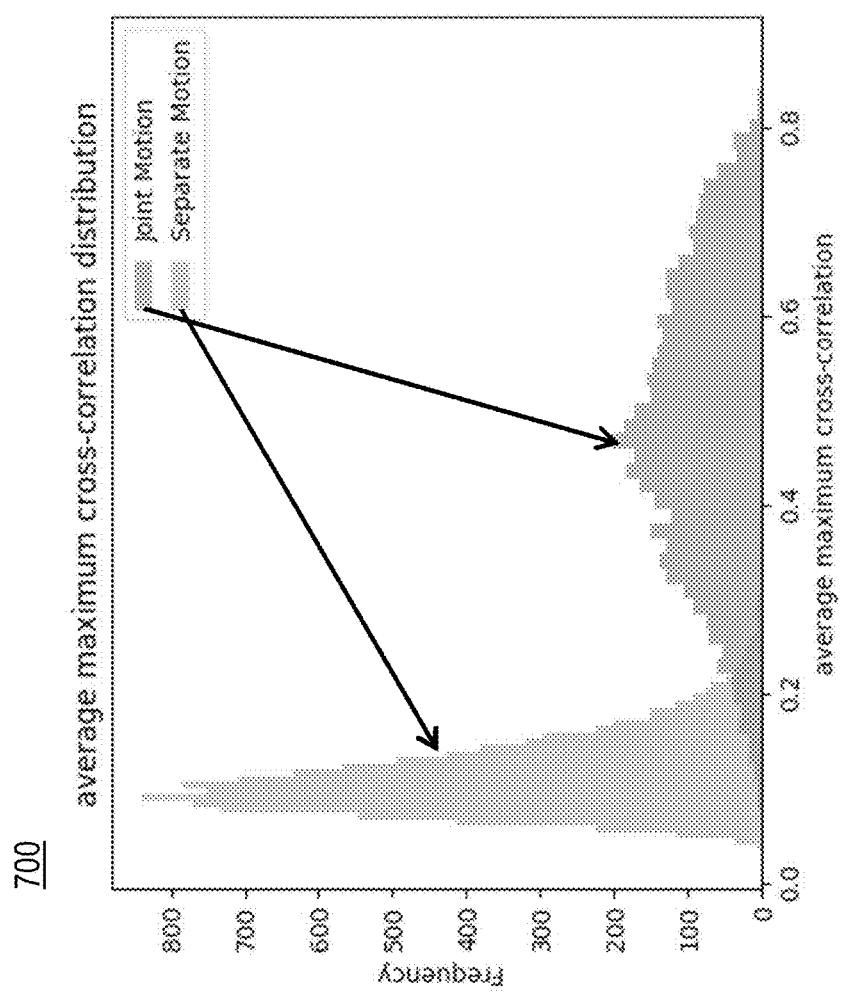
FIGS. 7A and 7B are graphs illustrating example correlations of sensor-specific joint predictions for use in computing a unified joint motion prediction.
Figure 7B:
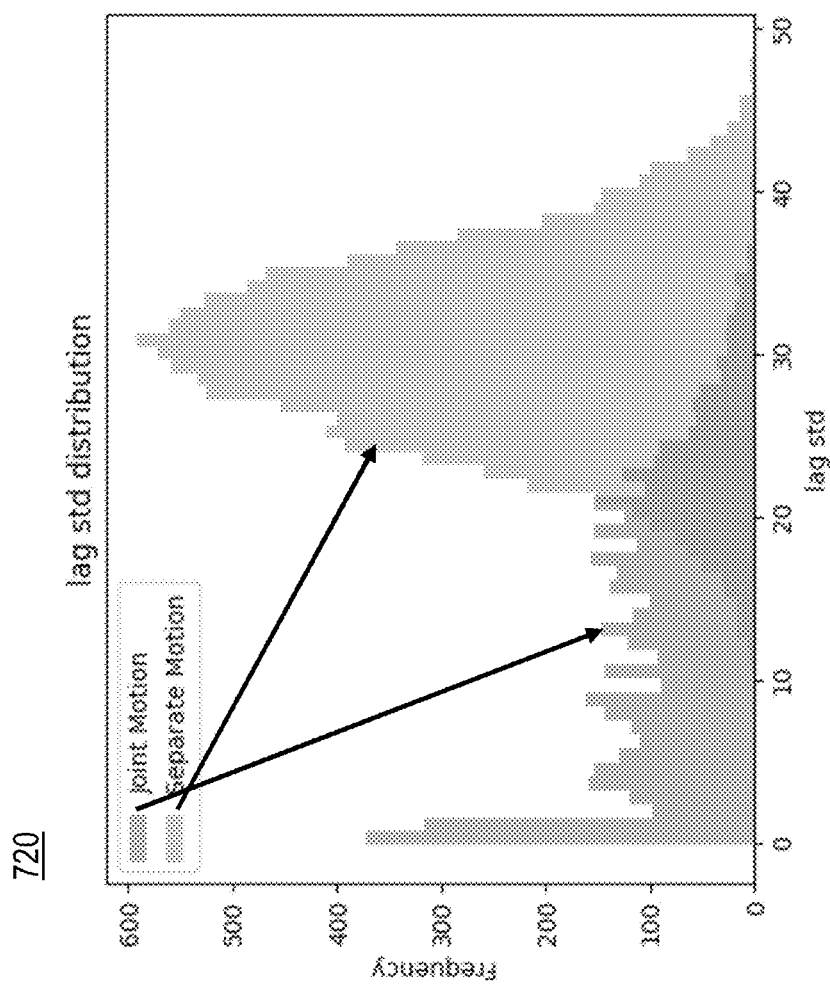

In one embodiment, there are multiple ways in which one can construct feature vectors out of the IMU sensor data (e.g., feature vectors for machine classification). Features may include (but are not limited to) correlation data (e.g., maximum value, lag, decay rate, and/or the like) for each IMU sensor (e.g., accelerometer, gyroscope, magnetometer), amplitudes, measures of energy content in each sensor, entropy, spectral coherence, etc. The example of FIGS. 7A and 7B illustrate a simple model based only on accelerometer data, utilizing maximum correlation value and lag as features. The IMU-Based JM classifier 403*b* calculates the correlation data in a sliding window of several seconds in duration (e.g., typically 8-10 s). The correlation data from multiple windows (typically over a period of 30 s to 200 s) is used to get the averaged maximum cross-correlation and the spread of the time lag (e.g., standard deviation as a measure). JM is expected to have high correlation with narrow lag spread while separate motion will have low correlation with a wide lag spread. By way of example, there are multiple classifiers that the IMU-Based JM classifier 403*b* can adopt for decision making such as but not limited to decision trees, logistic regression variants, SVM, neural networks, etc. For illustration purposes, FIGS. 7A and 7B demonstrate the results obtained using logistic regression classifier.

For example, empirical analysis can demonstrate about a 95% accuracy in 60 sec using the IMU-Based JM classifier 403*b* as demonstrated in the histogram 700 of FIG. 7A and histogram 720 of FIG. 7B. Note, this approach does not require precise clock synchronization and works well with clock differences up to a few seconds or more.

In one embodiment, the IMU-Based JM classifier 403*b* can also use the magnetic field, as typically sampled by the IMU, to determine or predict JM. There are a few utilization options possible. For example, the first one consists on the unique quasi-static magnetic field that is present within the car or vehicle 103, which is generated by the earth's magnetic field and the corresponding magnetic induction thereof. The spatial magnetic vector, as well as its relatively slow change over time due to turns, can be used for JM determination. In addition, higher frequency magnetic field components, emerging from the electronic systems of the car or vehicle 103, and which are typical to a vehicle model or even a single vehicle, can be used as a "vehicle fingerprint" to determine JM. For example, if both UEs 101 detect the same vehicle fingerprint, the IMU-Based JM classifier 403*b* can determine joint motion.

NFC-Based JM Classifier 403*c*:

In one embodiment, the plurality of different sensor types configured in the UEs 101 includes NFC receivers or sensors. Generally, NFC communication works at extremely short ranges, typically up to 20 cm. In a JM situation, such short separations between two phones are plausible though not very frequent (e.g., if two UEs 101 are placed in the same compartment). If two UEs 101 can communicate via NFC, it is an absolute indication of proximity. If the proximity extends for more than a threshold time window (e.g., 1 min), it indicates a JM event that can be predicted by the NFC-Based JM Classifier 403*c*.

Bluetooth-Based JM Classifier 403*d*:

In one embodiment, the plurality of different sensor types configured in the UEs 101 includes Bluetooth or equivalent short-range wireless receivers or sensors. Bluetooth signal intensity is distance-dependent and has a power-law decay as the distance increases. For example, the distance estimation model based on Bluetooth signals is given as:

$$\text{RSSI}(d) = -(10 \times n)\log_{10} d - A$$

Where n is the effective decay exponent, d is the relative distance between the communicating devices, and A is a reference received signal strength in dBm (e.g., the RSSI value measured when the separation distance between the receiver and the transmitter is one meter). Although the constants of the above expression are unknown, one can get a rough estimate based on the BT device spec, so if two UEs 101 can scan for the RSSI signal and get a meaningful value, the Bluetooth-Based JM classifier 403*d* can determine that the two UEs 101 are nearby and can get a rough distance estimate to within a few meters. Moreover, if the RSSI is relatively constant over an extended period (e.g., more than a threshold duration), it is an indication of a JM event that can be used by the Bluetooth-Based JM classifier 403*d* to predict JM.

In one embodiment, once the Bluetooth-Based JM classifier 403*d* has an estimate of the distance between two or more UEs 101, a methodology similar to the location-based algorithm above can be applied to predict JM.

Acoustic-Based JM Classifier 403*e*:

In one embodiment, the plurality of different sensor types configured in the UEs 101 includes acoustic sensors (e.g., microphones). In one embodiment, acoustics can be employed in two modes of operation, active or passive. For example, in active mode, one of the two or more UEs 101 (or both) can broadcast short bursts of predefined signals via the internal speaker. The signals are arbitrary, but the system 100 can select signals in the higher part of the microphone frequency response, typically in the 15-22 kHz. Examples for such acoustic signals are pseudo random noise sequences (e.g., a maximum length sequences—MLS sequences) that allow for high signal to noise ratio at relatively low broadcast intensity, thus minimizing the audible inconvenience to the people around. The microphone on the receiving UE 101 records the signal and compares it to the (known) broadcast signal, e.g., by a time cross-correlation function. The Acoustic-Based JM classifier 403*e* can use a high peak in the cross-correlation is an indication that two or more UEs 101 are in proximity of each other.

In the passive mode, the two UEs 101 synchronize the recording of background noise over a few seconds or other designated period of time. The two signals are highly correlated if the two devices are nearby. The Acoustic-Based JM classifier 403*e* can then use the correlation to predict JM.

Map-Based Meta-Data JM Classifier 403*f*:

In one embodiment, combining maps (e.g., the geographic database 113) and location data (e.g., sensed by the UEs 101) can provide useful metadata. The Map-Based JM classifier 403*f* can use the sensed location data of the UEs 101 to query for meta data or attributes associated with the location of the UEs 101 that can help increase the accuracy of JM predictions. For example, since drop-off and pickup of passengers are unlikely to happen on highways and tunnels, the JM events are detected at such locations are may likely be false positive events. In another use case, for specific individuals for which personal points of interest are known (e.g. home, work, etc.), or global points of interest such as shopping centers, train stations etc., there is an increased probability that JM events will take place at such locations. In other words, the Map-Based JM classifier 403f, retrieves map data associated with one or more locations of the at least two UEs 101, and calculates a map-based joint motion prediction or verifies a joint motion prediction based on the map data. In one embodiment, instead of being used by a separate classifier, the map metadata can be fused in the unified classifier 405 described below.

In step 505, the unified classifier 405 processes the respective sensor-type joint motion prediction for said each sensor to compute a unified joint motion prediction for the at least two devices. As previously described, the unified joint motion prediction indicates that the at least two devices are sharing a same transportation vehicle based on multiple different sensor types and not just one sensor (e.g., as in the location data only approach). In one embodiment, considering that the JM platform 109 has multiple data sources (e.g., multiple individual sensor specific joint motion predictions) and metadata (e.g., map data from the geographic database 113) to fuse together, multiple approaches can be applied. The approaches include (but are not limited to) hidden Markov model, classifiers such as decision trees and their variants, auto-regressive linear models, deep neural networks (DNN), and/or equivalent.

In one embodiment, a State Machine architecture, comprised of current and all potential states of the system and transition functions between them, can also be constructed to compute a unified joint motion prediction from the different data sources. In yet another embodiment, the unified JM classifier 405 can be based on a voting algorithm or equivalent to combine the different sensor-specific joint motion predictions. One example voting scheme can include but is not limited to simply taking a majority vote among the different sensor-specific classifiers 403 to determine whether two or more UEs 101 are in joint motion, separate motion, and/or undecided motion.

Figure 8:
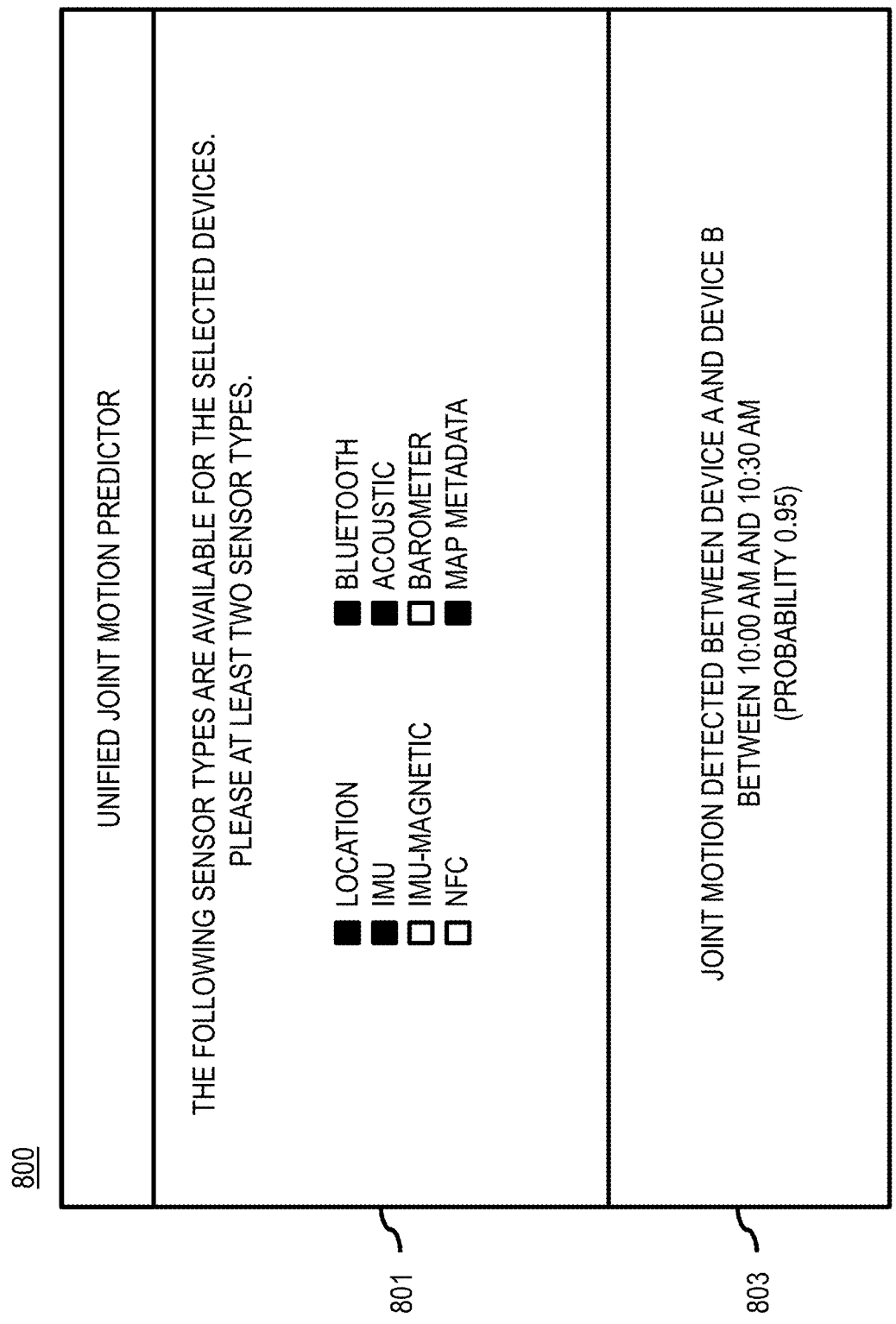
FIG. 8 illustrates an example user interface for presenting a unified joint motion prediction based on multiple sensor data, according to one embodiment.

In step 507, the output module 407 provides the unified joint motion prediction as an output. It is contemplated output can be used to support any service or application which relies or uses joint motion data. In one embodiment, the output can be used directly by the JM platform 109 or provided to external services or applications (e.g., via the service platform 117, services 119, content providers 121, etc.). FIG. 8 illustrates an example user interface 800 for presenting a unified joint motion prediction based on multiple sensor data, according to one embodiment. In the example of FIG. 8, the JM platform 109 has ingested sensor data from multiple sensors of two devices (e.g., device A and device B) to determine whether the two devices are in a joint motion state. The sensor data for instance includes data collected over a period of time (e.g., between 10:00 AM and 10:30 AM on a given day of the week). The JM platform 109 determines that the collected data includes the data of the following sensor types: location, IMU, IMU-magnetic, NFC, Bluetooth, acoustic, Barometer, and map metadata.

The JM platform 109 then generates a user interface element 801 that presents a list of sensor types available for predicting joint motion according and options for the user to select which of the sensor types to use for joint motion prediction. As shown, the user has selected the following sensor types (e.g., as indicated by a black box next to the sensor type): location, IMU, Bluetooth, acoustic, and map metadata. The JM platform 109 then applies the sensor specific classifiers 403 corresponding to the selected sensor types to make individual or sensor specific joint motion predictions. The unified classifier 405 of the JM platform 109 fuses individual joint motion predictions with the corresponding map metadata to make a unified joint motion prediction for the devices A and B for the corresponding time period. The JM platform 109 then presents a user interface element 803 to display the unified joint motion prediction (e.g., "Joint motion detected between device A and device B between 10:00 AM and 10:30 AM") and provides the corresponding prediction probability or confidence (e.g., "Probability 0.95").

Returning to FIG. 1, the system 100 comprises one or more UEs 101 and/or one or more vehicles 103 having connectivity to the JM platform 109 via a communication network 115. By way of example, the UEs 101 may be a personal navigation device ("PND"), a cellular telephone, a mobile phone, a personal digital assistant ("PDA"), a watch, a camera, a computer, an in-vehicle or embedded navigation system, and/or other device that is configured with multiple sensors types that can be used for join motion detection according to the embodiments described herein. It is contemplated, that the cellular telephone or other wireless communication device may be interfaced with an on-board navigation system of an autonomous vehicle or physically connected to the vehicle 103 for serving as the navigation system. Also, the UEs 101 and/or vehicles 103 may be configured to access the communication network 115 by way of any known or still developing communication protocols. Via this communication network 115, the UEs 101 and/or vehicles 103 may transmit sensor data collected from multiple different sensor types 105 for facilitating joint motion detection.

The UEs 101 and/or vehicles 103 may be configured with multiple sensors 105 of different types for acquiring and/or generating sensor data according to the embodiments described herein. For example, sensors 105 may be used as GPS or other positioning receivers for interacting with one or more location satellites to determine and track the current speed, position and location of a vehicle travelling along a roadway. In addition, the sensors 105 may gather IMU data, NFC data, Bluetooth data, acoustic data, barometric data, tilt data (e.g., a degree of incline or decline of the vehicle during travel), motion data, light data, sound data, image data, weather data, temporal data and other data associated with the vehicle and/or UEs 101 thereof. Still further, the sensors 105 may detect local or transient network and/or wireless signals, such as those transmitted by nearby devices during navigation of a vehicle along a roadway. This may include, for example, network routers configured within a premise (e.g., home or business), another UE 101 or vehicle 103 or a communicable traffic system (e.g., traffic lights, traffic cameras, traffic signals, digital signage). In one embodiment, the JM platform 109 aggregates multiple sensor data gathered and/or generated by the UEs 101 and/or vehicles 103 resulting from traveling in joint motion or separate motion.

By way of example, the JM platform 109 may be implemented as a cloud based service, hosted solution or the like for performing the above described functions. Alternatively, the JM platform 109 may be directly integrated for processing data generated and/or provided by the service platform 117, one or more services 119, and/or content providers 121. Per this integration, the JM platform 109 may perform client-side state computation of road curvature data.

By way of example, the communication network 115 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

A UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that a UE 101 can support any type of interface to the user (such as "wearable" circuitry, etc.).

By way of example, the UE 101s, the JM platform 109, the service platform 117, and the content providers 121 communicate with each other and other components of the communication network 115 using well known, new or still developing protocols. In this context, a protocol includes a set of rules defining how the network nodes within the communication network 115 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 9:
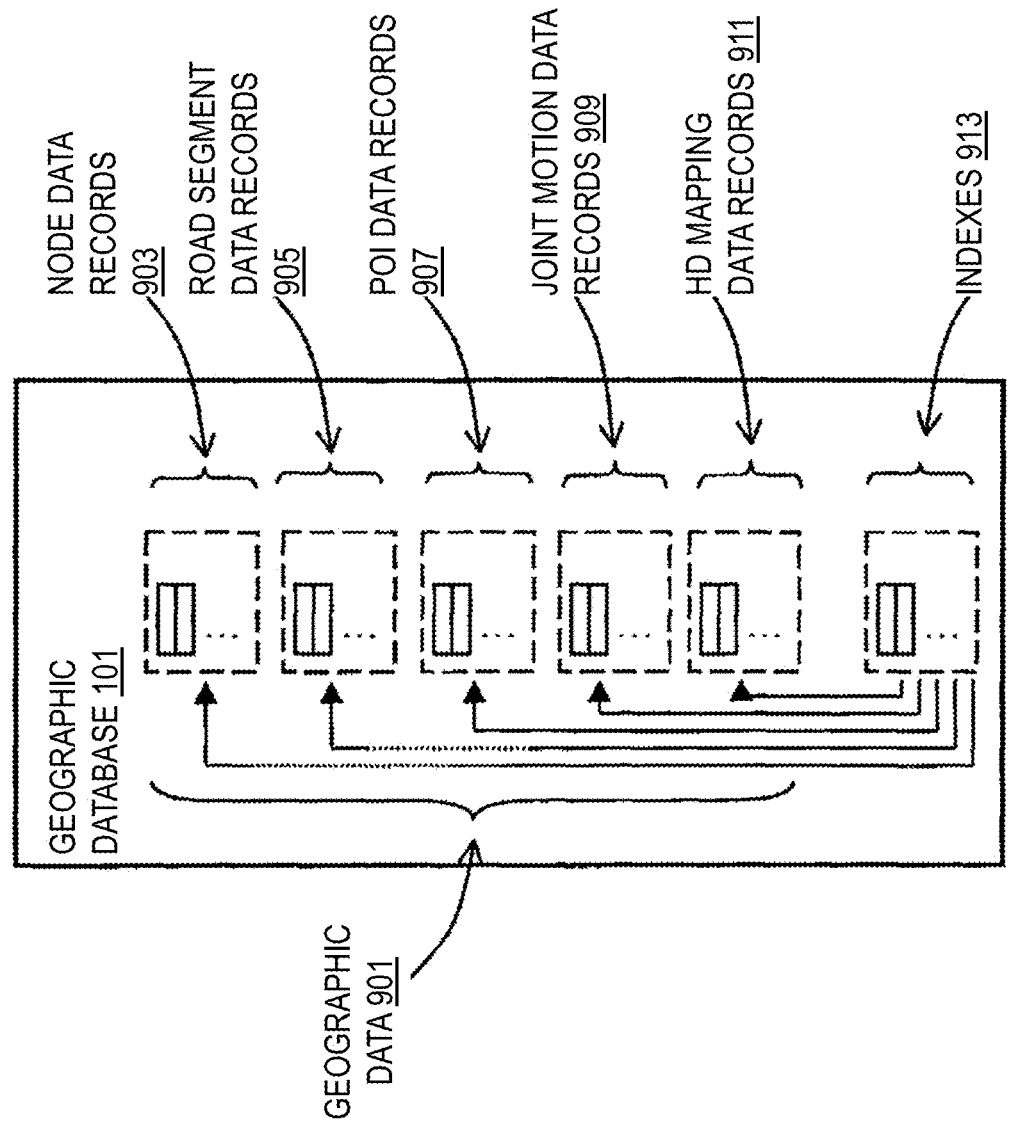
FIG. 9 is a diagram of a geographic database, according to one embodiment.

FIG. 9 is a diagram of a geographic database, according to one embodiment. In one embodiment, the geographic database 113 includes geographic data 901 used for (or configured to be compiled to be used for) mapping and/or navigation-related services, such as for providing map embedding analytics according to the embodiments described herein. For example, the map data records stored herein can be used to determine the semantic relationships among the map features, attributes, categories, etc. represented in the geographic data 901. In one embodiment, the geographic database 113 include high definition (HD) mapping data that provide centimeter-level or better accuracy of map features. For example, the geographic database 113 can be based on Light Detection and Ranging (LiDAR) or equivalent technology to collect billions of 3D points and model road surfaces and other map features down to the number lanes and their widths. In one embodiment, the HD mapping data (e.g., HD data records 911) capture and store details such as the slope and curvature of the road, lane markings, roadside objects such as sign posts, including what the signage denotes. By way of example, the HD mapping data enable highly automated vehicles to precisely localize themselves on the road.

In one embodiment, geographic features (e.g., two-dimensional or three-dimensional features) are represented using polylines and/or polygons (e.g., two-dimensional features) or polygon extrusions (e.g., three-dimensional features). In one embodiment, these polylines/polygons can also represent ground truth or reference features or objects (e.g., signs, road markings, lane lines, landmarks, etc.) used for visual odometry. For example, the polylines or polygons can correspond to the boundaries or edges of the respective geographic features. In the case of a building, a two-dimensional polygon can be used to represent a footprint of the building, and a three-dimensional polygon extrusion can be used to represent the three-dimensional surfaces of the building. Accordingly, the terms polygons and polygon extrusions as used herein can be used interchangeably.

In one embodiment, the following terminology applies to the representation of geographic features in the geographic database 113.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 113 follows certain conventions. For example, links do not cross themselves and do not cross each other except at a node. Also, there are no duplicated shape points, nodes, or links. Two links that connect each other have a common node. In the geographic database 113, overlapping geographic features are represented by overlapping polygons. When polygons overlap, the boundary of one polygon crosses the boundary of the other polygon. In the geographic database 113, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 113 includes node data records 903, road segment or link data records 905, POI data records 907, joint motion data records 909, HD mapping data records 911, and indexes 913, for example. More, fewer or different data records can be provided. In one embodiment, additional data records (not shown) can include cartographic ("carto") data records, routing data, and maneuver data. In one embodiment, the indexes 913 may improve the speed of data retrieval operations in the geographic database 113. In one embodiment, the indexes 913 may be used to quickly locate data without having to search every row in the geographic database 113 every time it is accessed. For example, in one embodiment, the indexes 913 can be a spatial index of the polygon points associated with stored feature polygons.

In exemplary embodiments, the road segment data records 905 are links or segments representing roads, streets, or paths, as can be used in the calculated route or recorded route information for determination of one or more personalized routes. The node data records 903 are end points corresponding to the respective links or segments of the road segment data records 905. The road link data records 905 and the node data records 903 represent a road network, such as used by vehicles, cars, and/or other entities. Alternatively, the geographic database 113 can contain path segment and node data records or other data that represent pedestrian paths or areas in addition to or instead of the vehicle road record data, for example. In one embodiment, the nodes and links can make up the base map and that base map can be associated with an HD layer including more detailed information, like lane level details for each road segment or link and how those lanes connect via intersections. Furthermore, another layer may also be provided, such as an HD live map, where road objects are provided in detail in regard to positioning, which can be used for localization. The HD layers can be arranged in a tile format.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 113 can include data about the POIs and their respective locations in the POI data records 907. The geographic database 113 can also include data about places, such as cities, towns, or other communities, and other geographic features, such as bodies of water, mountain ranges, etc. Such place or feature data can be part of the POI data records 907 or can be associated with POIs or POI data records 907 (such as a data point used for displaying or representing a position of a city).

In one embodiment, the geographic database 113 can also include joint motion data records 909 for storing joint motion data predicted from one or more people or devices. The joint motion data records 909 can also store related data including but not limited to underlying sensor data probe data, individual or sensor specific joint motion detections, available sensor types, and/or any other data used or generated according to the embodiments described herein. By way of example, the joint motion data records 909 can be associated with one or more of the node records 903, road segment records 905, and/or POI data records 907 to associate the detected joint motion with specific geographic areas or features. In this way, the map embedding data records 909 can also be associated with the characteristics or metadata of the corresponding records 903, 905, and/or 907.

In one embodiment, as discussed above, the HD mapping data records 911 model road surfaces and other map features to centimeter-level or better accuracy (e.g., including centimeter-level accuracy for ground truth objects used for visual odometry based on polyline homogeneity according to the embodiments described herein). The HD mapping data records 911 also include ground truth object models that provide the precise object geometry with polylines or polygonal boundaries, as well as rich attributes of the models. These rich attributes include, but are not limited to, object type, object location, lane traversal information, lane types, lane marking types, lane level speed limit information, and/or the like. In one embodiment, the HD mapping data records 911 are divided into spatial partitions of varying sizes to provide HD mapping data to end user devices with near real-time speed without overloading the available resources of the devices (e.g., computational, memory, bandwidth, etc. resources).

In one embodiment, the HD mapping data records 911 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the HD mapping data records 911.

In one embodiment, the HD mapping data records 911 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time data (e.g., including probe trajectories) also at centimeter-level accuracy. Other sensor data can include vehicle telemetry or operational data such as windshield wiper activation state, braking state, steering angle, accelerator position, and/or the like. The HD mapping data records may be provided as a separate map layer.

In one embodiment, the geographic database 113 can be maintained by the content provider 121 in association with the services platform 117 (e.g., a map developer). The map developer can collect geographic data to generate and enhance the geographic database 113. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 113 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. Other formats including tile structures for different map layers may be used for different delivery techniques. The data in the production and/or delivery formats can be compiled or further compiled to form geographic database products or databases, which can be used in end user navigation devices or systems.

For example, geographic data is compiled (such as into a platform specification format (PSF)) to organize and/or configure the data for performing navigation-related functions and/or services, such as route calculation, route guidance, map display, speed calculation, distance and travel time functions, and other functions, by a navigation device, such as by a vehicle 103 and/or UE 101. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for detecting joint motion using multiple sensor data may be advantageously implemented via software, hardware (e.g., general processor, Digital Signal Processing (DSP) chip, an Application Specific Integrated Circuit (ASIC), Field Programmable Gate Arrays (FPGAs), Quantum Computer, etc.), firmware or a combination thereof. Such exemplary hardware for performing the described functions is detailed below.

Figure 10:
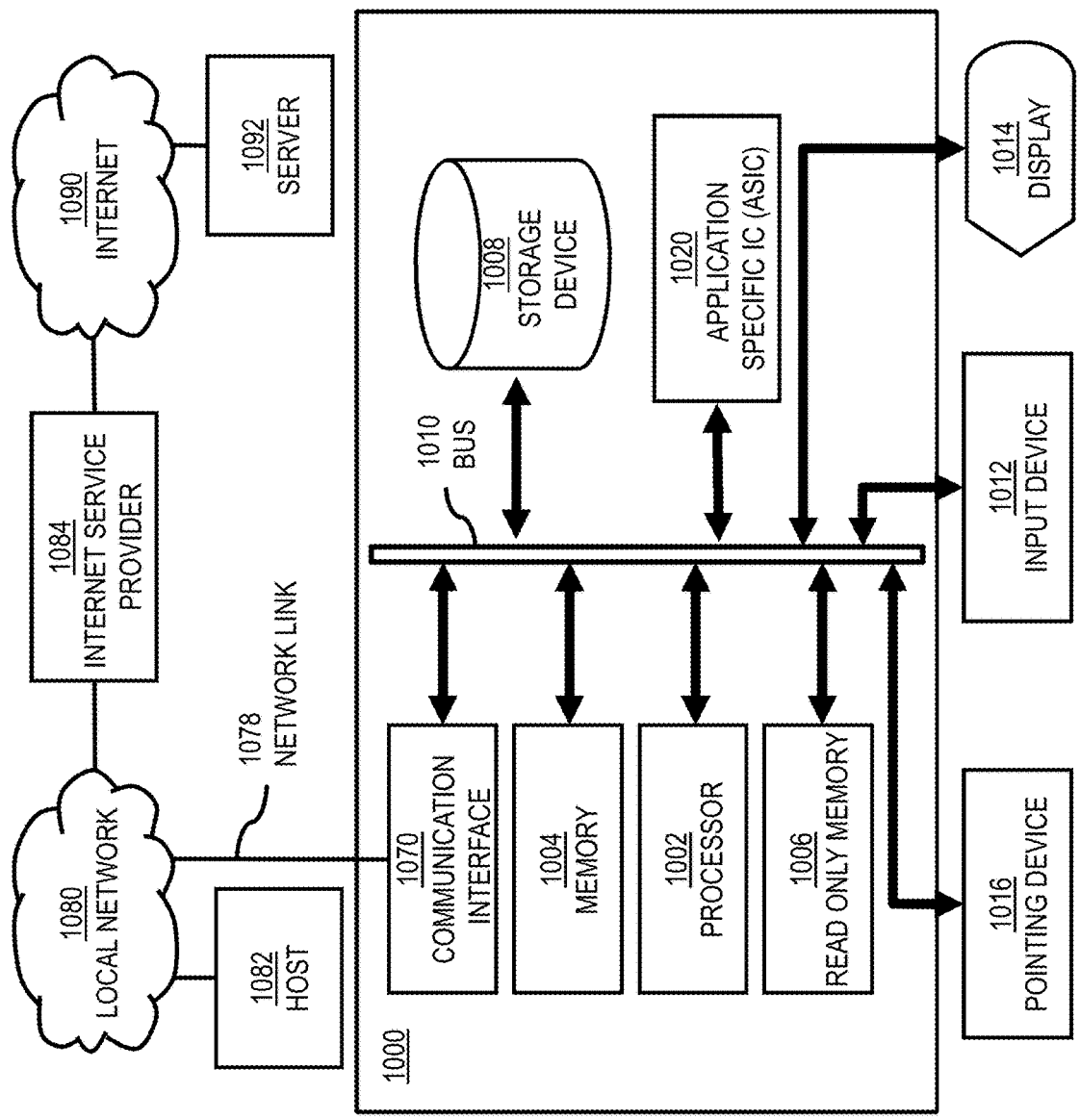
FIG. 10 is a diagram of hardware that can be used to implement an embodiment.

FIG. 10 illustrates a computer system 1000 upon which an embodiment of the invention may be implemented. Computer system 1000 is programmed (e.g., via computer program code or instructions) to detect joint motion using multiple sensor data as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1010 includes one or more parallel conductors of information so that information is transferred quickly among devices coupled to the bus 1010. One or more processors 1002 for processing information are coupled with the bus 1010.

A processor 1002 performs a set of operations on information as specified by computer program code related to detecting joint motion using multiple sensor data. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1000 also includes a memory 1004 coupled to bus 1010. The memory 1004, such as a random access memory (RAM) or other dynamic storage device, stores information including processor instructions for detecting joint motion using multiple sensor data. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for detecting joint motion using multiple sensor data, is provided to the bus 1010 for use by the processor from an external input device 1012, such as a keyboard containing alphanumeric keys operated by a human user, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT) or a liquid crystal display (LCD), or plasma screen or printer for presenting text or images, and a pointing device 1016, such as a mouse or a trackball or cursor direction keys, or motion sensor, for controlling a position of a small cursor image presented on the display 1014 and issuing commands associated with graphical elements presented on the display 1014. In some embodiments, for example, in embodiments in which the computer system 1000 performs all functions automatically without human input, one or more of external input device 1012, display device 1014 and pointing device 1016 is omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of application specific ICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic or electromagnetic signals, including infrared and optical signals, that carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection to the communication network 115 for detecting joint motion using multiple sensor data.

The term computer-readable medium is used herein to refer to any medium that participates in providing information to processor 1002, including instructions for execution. Such a medium may take many forms, including, but not limited to, non-volatile media, volatile media and transmission media. Non-volatile media include, for example, optical or magnetic disks, such as storage device 1008. Volatile media include, for example, dynamic memory 1004. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 11 illustrates a chip set 1100 upon which an embodiment of the invention may be implemented. Chip set 1100 is programmed to detect joint motion using multiple sensor data as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to detect joint motion using multiple sensor data. The memory 1105 also stores the data associated with or generated by the execution of the inventive steps.

Figure 12:
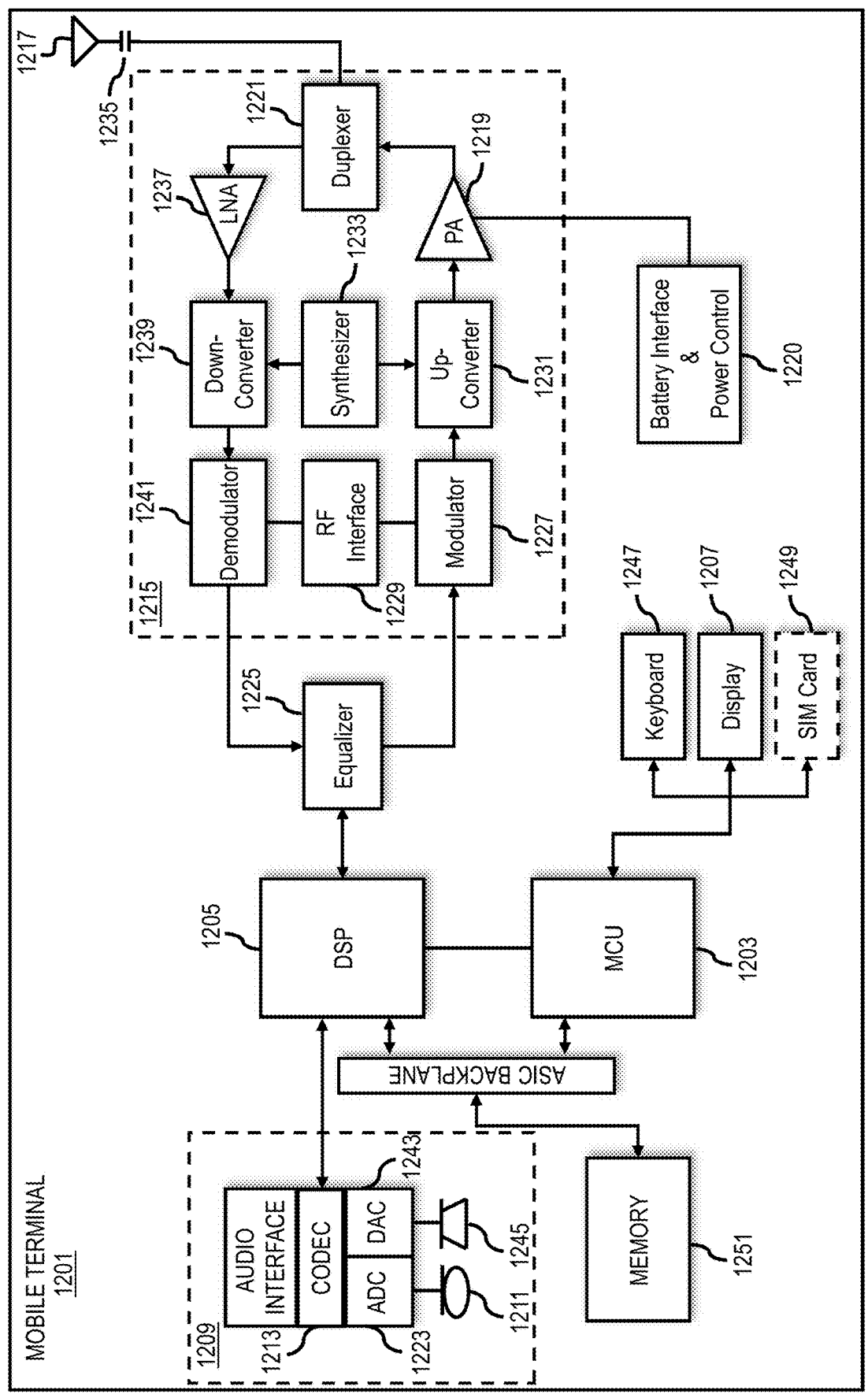
FIG. 12 is a diagram of a mobile terminal that can be used to implement an embodiment.

FIG. 12 is a diagram of exemplary components of a mobile terminal 1201 (e.g., a UE 101, vehicle 103, or part thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile station functions that offer automatic contact matching. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile station 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203—which can be implemented as a Central Processing Unit (CPU) (not shown).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile station 1201 to detect joint motion using multiple sensor data. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the station. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile station 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1251 may be, but not limited to, a single memory, CD, DVD, ROM, RAM, EEPROM, optical storage, or any other non-volatile or non-transitory storage medium capable of storing digital data.

An optionally incorporated SIM card 1249 carries, for instance, important information, such as the cellular phone number, the carrier supplying service, subscription details, and security information. The SIM card 1249 serves primarily to identify the mobile station 1201 on a radio network. The card 1249 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for detecting a joint motion based on multiple sensor data comprising:

retrieving sensor data from at least two devices, wherein the sensor data is collected using at least one sensor type from among a plurality of sensor types and wherein each sensor type of the plurality of sensor types is associated with a respective joint motion classifier, wherein the plurality of different sensor types includes a location sensor type that collects location data as the sensor data, wherein the location data includes a distance that the at least two devices are apart over a period of time;

processing the sensor data using the respective joint motion classifier for said each sensor type of the at least one sensor type to compute a respective sensor-type joint motion prediction;

processing the respective sensor-type joint motion prediction for said each sensor type using a unified classifier to compute a unified joint motion prediction for the at least two devices; and providing the unified joint motion prediction as an output, wherein the respective joint motion classifier is associated with one sensor type of a single device.

2. The method of claim 1, wherein the unified joint motion prediction indicates that the at least two devices are sharing a same transportation vehicle.

3. The method of claim 1, further comprising:
calculating one or more instantaneous joint motion probabilities for the at least two devices based on the location data; and
calculating a rolling window joint motion probability for a time window based on the one or more instantaneous joint motion probabilities falling within the time window,
wherein the respective sensor-type joint motion prediction for the location sensor type is based on the rolling window joint motion probability, the one or more instantaneous joint motion probabilities, or a combination thereof.

4. The method of claim 1, wherein the plurality of different sensor types includes an inertial measurement unit (IMU) sensor type that collects IMU data as the sensor data, the method further comprising:
calculating a cross-correlation between the IMU data of the at least two devices,
wherein the respective sensor-type joint motion prediction for the IMU sensor type is based on the cross-correlation.

5. The method of claim 1, wherein the plurality of different sensor types includes an inertial measurement unit (IMU) sensor type that collects IMU data as the sensor data, the method further comprising:
calculating a magnetic field for each of the at least two devices based on the IMU data,
wherein the respective sensor-type joint motion prediction for the IMU sensor type is based on a comparison of the magnetic field for said each of the at least two devices.

6. The method of claim 1, wherein the plurality of different sensor types includes a near field communication (NFC) sensor type, and wherein the respective sensor-type joint motion prediction for the NFC sensor type is based on determining that the at least two devices are communicating with a same NFC device.

7. The method of claim 1, wherein the plurality of different sensor types includes a Bluetooth sensor type that collects Bluetooth data, the method further comprising:
calculating a relative distance between the at least two devices based on the Bluetooth data,
wherein the respective sensor-type joint motion prediction for the Bluetooth sensor type is based on the relative distance.

8. The method of claim 1, wherein the plurality of different sensor types includes an acoustic sensor type that collects acoustic data, the method further comprising:
generating an acoustic signal that is broadcast by at least one of the at least two devices, another acoustic device, or a combination thereof that is sampled by an acoustic sensor of the at least one of the at least two devices;
processing the acoustic data to determine a cross-correlation of the acoustic signal between the at least two devices,
wherein the respective sensor-type joint motion prediction for the acoustic sensor type is based on the cross-correlation.

9. The method of claim 1, wherein the plurality of different sensor types includes an acoustic sensor type that collects acoustic data, the method further comprising:
processing the acoustic data to determine an ambient acoustic environment of the at least two devices,
wherein the respective sensor-type joint motion prediction for the acoustic sensor type is based on a comparison of the ambient acoustic environment of the at least two devices.

10. The method of claim 1, wherein the plurality of different sensor types includes a barometric sensor type that collects barometric data as the sensor data, the method further comprising:
calculating a cross-correlation between the barometric data of the at least two devices,
wherein the respective sensor-type joint motion prediction for the barometer sensor type is based on the cross-correlation.

11. The method of claim 1, further comprising:
retrieving map data associated with one or more locations of the at least two devices;
calculating a map-based joint motion prediction based on the map data,
wherein the unified joint motion prediction is further based on the map-based joint motion prediction.

12. The method of claim 1, wherein the unified classifier is a state machine that fuses the respective sensor-type joint motion prediction for said each sensor to compute the unified joint motion prediction.

13. An apparatus for detecting a joint motion based on multiple sensor data comprising:
at least one processor; and
at least one memory including computer program code for one or more programs,
the at least one memory and the computer program code configured to, with the at least one processor, cause the apparatus to perform at least the following,
retrieve sensor data from at least two devices, wherein the sensor data is collected using at least one sensor type from among a plurality of sensor types and wherein each sensor type of the plurality of sensor types is associated with a respective joint motion classifier, wherein the plurality of different sensor types includes a location sensor type that collects location data as the sensor data, wherein the location data includes a distance that the at least two devices are apart over a period of time;
process the sensor data using the respective joint motion classifier for said each sensor type of the at least one sensor type to compute a respective sensor-type joint motion prediction;

process the respective sensor-type joint motion prediction for said each sensor type using a unified classifier to compute a unified joint motion prediction for the at least two devices; and provide the unified joint motion prediction as an output.

14. The apparatus of claim 13, wherein the unified classifier is a state machine that fuses the respective sensor-type joint motion prediction for said each sensor to compute the unified joint motion prediction.

15. The apparatus of claim 13, wherein the plurality of different sensor types includes a location sensor type, an inertial measurement unit sensor type, a near field communication sensor type, a Bluetooth sensor type, an acoustic sensor type, a barometer sensor type, or a combination thereof.

16. A non-transitory computer readable storage medium for detecting a joint motion based on multiple sensor data carrying one or more sequences of one or more instructions which, when executed by one or more processors, cause an apparatus to perform:

retrieving sensor data from at least two devices, wherein the sensor data is collected using at least one sensor type from among a plurality of sensor types and wherein each sensor type of the plurality of sensor types is associated with a respective joint motion classifier, wherein the plurality of different sensor types includes a location sensor type that collects location data as the sensor data, wherein the location data includes a distance that the at least two devices are apart over a period of time;

processing the sensor data using the respective joint motion classifier for said each sensor type of the at least one sensor type to compute a respective sensor-type joint motion prediction;

processing the respective sensor-type joint motion prediction for said each sensor type using a unified classifier to compute a unified joint motion prediction for the at least two devices; and providing the unified joint motion prediction as an output.

17. The non-transitory computer readable storage medium of claim 16, wherein the unified joint motion prediction indicates that the at least two devices are sharing a same transportation vehicle.

18. The non-transitory computer readable storage medium of claim 16, wherein the unified classifier is a state machine that fuses the respective sensor-type joint motion prediction for said each sensor to compute the unified joint motion prediction.

19. The non-transitory computer readable storage medium of claim 16, wherein the plurality of different sensor types includes a location sensor type, an inertial measurement unit sensor type, a near field communication sensor type, a Bluetooth sensor type, an acoustic sensor type, a barometer sensor type, or a combination thereof.

20. The method of claim 1, wherein the respective sensor-type joint motion prediction is associated with one sensor type; and the unified joint motion prediction is associated with at least one sensor type of the at least two devices.

* * * * *